US007536803B2

(12) United States Patent
Samuels

(10) Patent No.: US 7,536,803 B2
(45) Date of Patent: May 26, 2009

(54) CUTTING GUIDE FOR ELECTRIC SCISSORS

(75) Inventor: Philip Samuels, St. Louis, MO (US)

(73) Assignee: Universal Sewing Supply, Inc., St. Louis, MO (US)

( * ) Notice: Subject to any disclaimer, the term of this patent is extended or adjusted under 35 U.S.C. 154(b) by 14 days.

(21) Appl. No.: 11/951,096

(22) Filed: Dec. 5, 2007

(65) Prior Publication Data

US 2009/0019707 A1 Jan. 22, 2009

Related U.S. Application Data

(60) Provisional application No. 60/950,796, filed on Jul. 19, 2007.

(51) Int. Cl.
*G01B 3/14* (2006.01)

(52) U.S. Cl. ............................ 33/566; 83/455; 30/289

(58) Field of Classification Search .................. 33/566, 33/562, 563, 17 R; 83/455, 56; 30/289, 30/286

See application file for complete search history.

(56) References Cited

U.S. PATENT DOCUMENTS

| | | | | |
|---|---|---|---|---|
| 312,227 | A | 2/1885 | Taft | |
| 816,529 | A | 3/1906 | Burt | |
| 1,341,445 | A * | 5/1920 | Stanley | 269/295 |
| 1,879,624 | A * | 9/1932 | Lockwood | 33/1 A |
| 2,190,071 | A | 2/1940 | Keppers | |
| 3,509,633 | A | 5/1970 | Fernandes | |
| 3,568,327 | A | 3/1971 | Furuoka | |
| 3,813,787 | A | 6/1974 | Mercorelli | |
| 3,871,079 | A | 3/1975 | Magee | |
| 3,925,899 | A | 12/1975 | Hesse et al. | |
| 4,057,898 | A * | 11/1977 | Piosky | 30/289 |
| 4,095,500 | A | 6/1978 | Rouse | |
| 4,096,631 | A | 6/1978 | Ward | |
| 4,170,065 | A | 10/1979 | Hiscott | |
| 4,382,590 | A | 5/1983 | Pandya et al. | |
| 4,589,210 | A | 5/1986 | Konrad | |
| 4,595,203 | A | 6/1986 | DeLano et al. | |
| 4,688,330 | A | 8/1987 | Konrad | |
| 4,924,594 | A * | 5/1990 | Fernandes | 33/483 |
| 5,065,523 | A | 11/1991 | Chiang | |
| 5,079,842 | A | 1/1992 | Ward | |
| 5,125,161 | A | 6/1992 | Guthrie | |
| 5,404,778 | A | 4/1995 | Ward | |
| 5,511,316 | A * | 4/1996 | Fischer et al. | 33/1 F |
| 5,557,996 | A * | 9/1996 | Reber et al. | 83/56 |
| D430,811 | S | 9/2000 | DeVos | |

(Continued)

*Primary Examiner*—Christopher W Fulton
(74) *Attorney, Agent, or Firm*—Senniger Powers LLP

(57) ABSTRACT

A cutting guide for use in cutting material using electric scissors or a similar tool includes an elongate cutting channel extending along a support surface. Opposing lower sections of side walls generally adjacent to a bottom of the channel are generally parallel and define a lower region of the channel therebetween having a generally uniform width for receiving a counter-blade of the electric scissors and allowing sliding movement of the counter-blade along the length of the channel. An upper region of the channel has a width greater than the width of the lower region of the channel for receiving a shearing blade of the scissors and permitting the oscillating movement of the shearing blade with respect to the counter-blade when the counter-blade is received in the lower region of the channel.

11 Claims, 10 Drawing Sheets

U.S. PATENT DOCUMENTS 6,216,354 B1 * 4/2001 Carbone ...................... 33/565
6,321,457 B1 11/2001 Lariviere, Jr. et al.
6,345,985 B1 2/2002 Arend et al.
6,829,833 B2 * 12/2004 Langman .................... 33/32.2
6,851,196 B1 2/2005 Fry Leever et al.
7,086,171 B2 * 8/2006 Lawson ...................... 33/562
7,287,339 B2 * 10/2007 Robertson .................... 33/562
7,404,257 B2 * 7/2008 Hung et al. ................... 33/562
2003/0093910 A1 * 5/2003 Chang ......................... 33/566
2005/0044722 A1 3/2005 Leever et al.
2005/0252019 A1 11/2005 Gordon et al.
2006/0027062 A1 2/2006 Whaley

* cited by examiner

CUTTING GUIDE FOR ELECTRIC SCISSORS

CROSS-REFERENCE TO RELATED APPLICATION

The present application claims priority to U.S. Provisional Application No. 60/950,796, filed Jul. 19, 2007, the entirety of which is herein incorporated by reference.

FIELD OF THE INVENTION

The present invention generally relates to a cutting guide for a cutting tool.

BACKGROUND OF THE INVENTION

In general, cutting guides are used in combination with a tool to cut material along a particular line or path. One type of cutting guide for use in cutting fabric or paper has a channel or groove for receiving a single blade of a cutting tool. For example, the cutting channel may have a width for receiving either the blade of a utility knife, or a rotary blade of a roller cutter, or a foot to which the blade of the cutter is secured. In particular, the cutting channel is configured to snugly receive the blade or the foot of the cutting tool to thereby guide the blade as the blade cuts the fabric supported by the upper surface of the cutting guide.

Conventional cutting guides are not suited for use with a pair of electric scissors having an oscillating shearing blade overlapping a stationary counter-blade. The uniform-width channel of a conventional cutting guide is not configured to both receive each blade of the scissors and prevent the blades from deviating laterally from the cut path. That is, the cutting channel will not snugly receive the stationary blade to guide the blade and allow the shearing blade to enter the channel without interfering with the movement of the blade. Further, if only the stationary blade is received in the channel and the shearing blade never enters the channel during use, then the cutting edge of the stationary blade will be positioned above the support surface of the cutting guide. In this instance, the fabric must be lifted off the support surface to be cut by the scissors. Lifting the fabric off the support surface leads to an imprecise cut.

SUMMARY OF THE INVENTION

In one aspect of the present invention, a cutting guide for use in cutting material using a cutting tool including a counter-blade and a shearing blade adapted for oscillating movement toward and away from the counter-blade to repeatedly move a cutting edge of the shearing blade past a cutting edge of the counter-blade so that the blades overlap during a cutting operation generally comprises a body having a support surface for supporting the material to be cut. At least one elongate cutting channel extends along the support surface. The cutting channel has a bottom and opposing side walls extending from the support surface to the bottom of the channel. Opposing lower sections of the side walls generally adjacent to the bottom of the channel are generally parallel and define a lower region of the channel therebetween for receiving the counter-blade of the tool and allowing sliding movement of the counter-blade along the length of the channel. Opposing upper sections of the side walls define an upper region of the channel having a width greater than the width of the lower region of the channel for receiving the shearing blade and permitting the oscillating movement of the shearing blade with respect to the counter-blade when the counter-blade is received in the lower region of the channel.

In another aspect of the invention, a cutting guide for use in cutting material using a cutting tool including a counter-blade and a shearing blade adapted for oscillating movement toward and away from the counter-blade to repeatedly move a cutting edge of the shearing blade past a cutting edge of the counter-blade so that the blades overlap during a cutting operation generally comprises a body having an support surface for supporting the material to be cut. At least one cutting channel formed in the body extends along the support surface. The cutting channel has a bottom and opposing side walls extending from the support surface to the bottom of the channel. The cutting channel is sized and shaped to receive the counter-blade of the cutting tool so as to allow the counter-blade to slide longitudinally within the channel so that the channel functions as a cutting guide for the tool. At least a portion of the cutting edge of the counter-blade is generally coplanar with at least a portion of the support surface generally adjacent to the cutting channel when the counter-blade is received in the cutting channel. The cutting channel is sized and shaped to allow the shearing blade to move past the cutting edge of the counter-blade and into the cutting channel without interfering with the oscillating movement of the shearing blade as the counter-blade is moved longitudinally within the channel.

In yet another aspect, a method of cutting material with electric scissors generally comprises supporting the material to be cut on a support surface of a cutting guide. A lower blade of the electric scissors is inserted into a cutting channel of the cutting guide so that at least a portion of a cutting edge of the lower blade is substantially coplanar with the support surface of the cutting guide adjacent to the cutting channel. An upper blade of the scissors oscillates up and down so that a cutting edge of the upper blade repeatedly moves past the cutting edge of the lower blade when the lower blade is received in the cutting channel. The scissors are moved along a length of the cutting channel so that the lower blade is guided within the channel as the upper blade oscillates up and down to cut the material.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
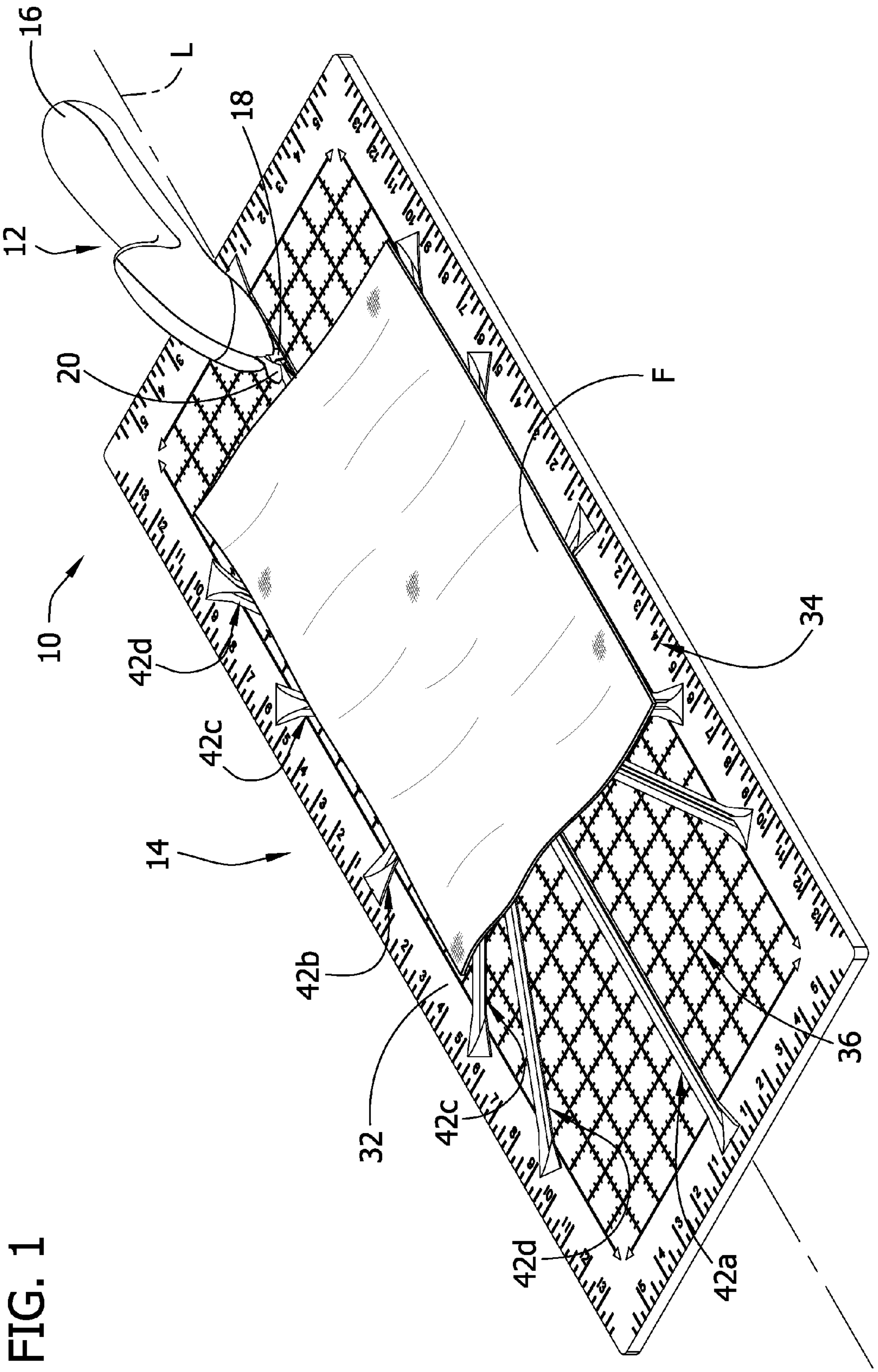
FIG. 1 is a perspective of a cutting system of one embodiment of the present invention including a pair of electric scissors and a cutting guide.
Figure 2:
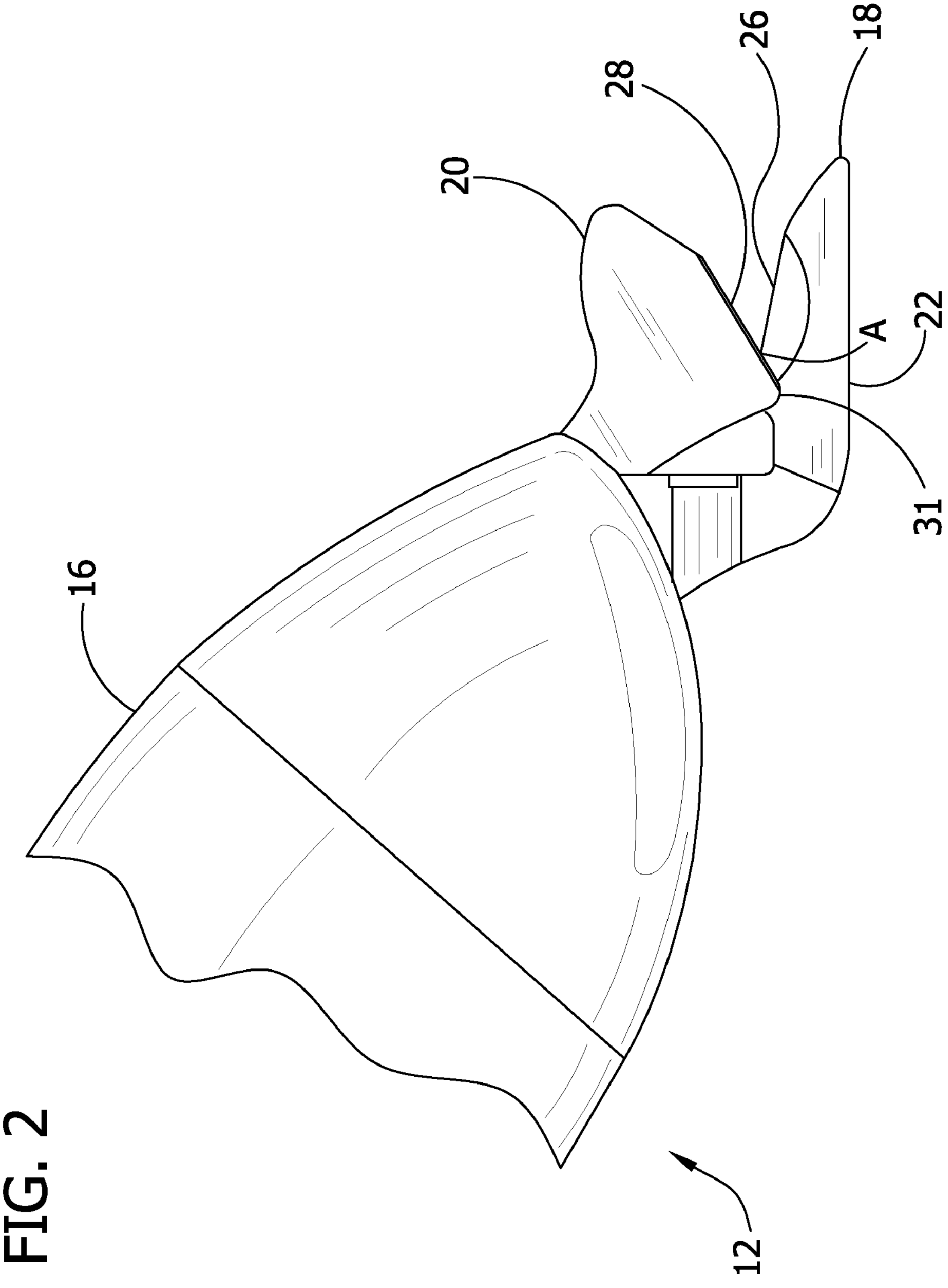
FIG. 2 is an enlarged, fragmentary side elevation of the electric scissors showing an upper shearing blade of the scissors in a raised position relative to a lower counter-blade.
Figure 3:
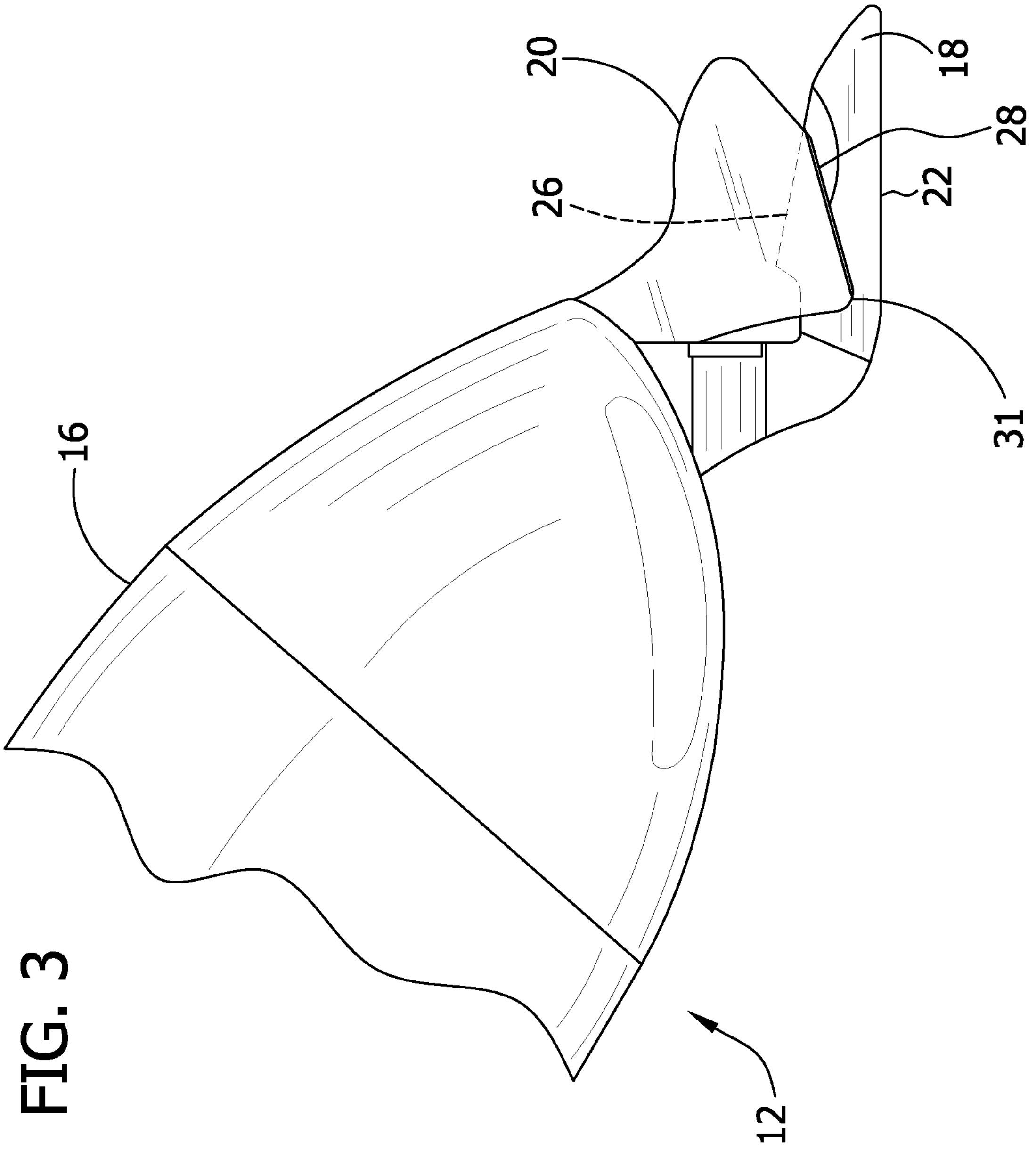
FIG. 3 is similar to FIG. 2 except the upper shearing blade is in a lowered position.
Figure 4:
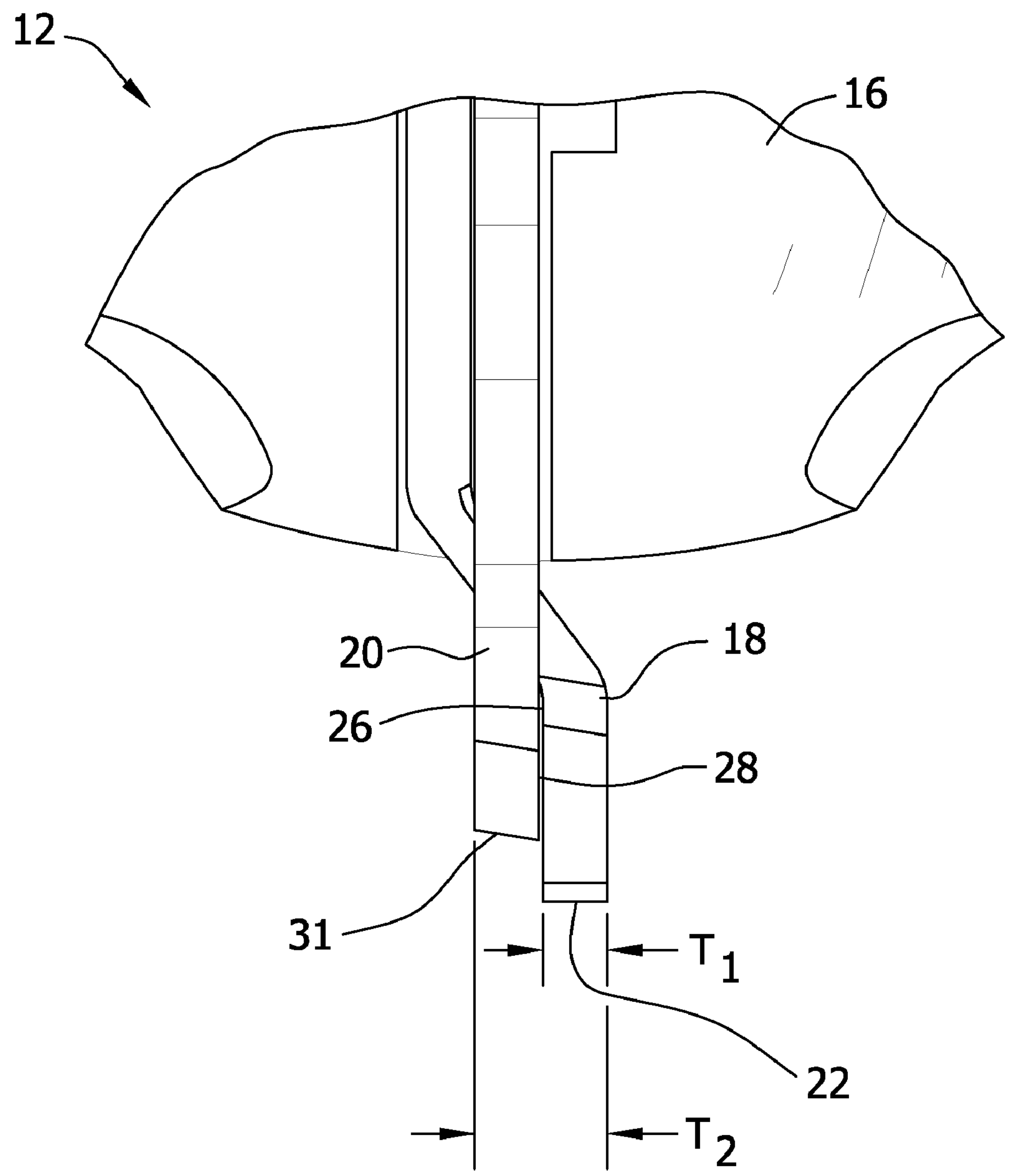
FIG. 4 is front elevation of the shearing blade and the counter-blade of FIG. 3.

Referring now to the drawings, and in particular to FIG. 1, a cutting system for quickly and accurately cutting a piece of material, such as fabric F, is generally designated 10. The cutting system includes a pair of electric scissors (broadly, a cutting tool), generally indicated at 12, and a cutting guide, generally indicated at 14, for use with the electric scissors. The illustrated pair of electric scissors 12 is generally known in the art. As shown best in FIGS. 1-3, the pair of electric scissors generally includes a housing 16 and lower and upper blades 18, 20, respectively, extending outward from one end of the housing. The lower blade 18 is a fixed counter-blade having a bottom surface 22, an upper cutting edge 26 and a thickness $T_1$ (FIG. 4). The upper blade 20 is a movable shearing blade that is operatively connected to a motor (not shown) in the housing 16. The upper blade 20 has a lower cutting edge 28.

Cutting action of the scissors 12 is achieved through reciprocating up and down movement of the upper blade 20 between a raised position (FIG. 2) and a lowered position (FIGS. 3 and 4) to repeatedly move the cutting edge 28 of the upper blade past the cutting edge 26 of the lower blade 18. At the raised position of the upper blade 20, the cutting edges 26, 28 of the blades 18, 20 define a generally V-shape opening having an apex A where the edges meet. In this configuration, the blades 18, 20 are "most open" for receiving the fabric F between the blades so that the fabric is director toward the apex A of the cutting edges 26, 28. Referring to FIG. 4, at the lowered position of the upper blade 20 (i.e., when the blades 18, 20 are "closed"), portions of the upper blade and the lower blade 18 overlap to define a combined maximum thickness $T_2$ of the blades. Also, when the upper blade 20 is at its lowered position, a lowermost portion 31 of the upper blade is spaced from the bottom surface 22 of the lower blade 18 so that a non-overlapping portion of the lower blade along its height is not overlapped by the upper blade. It is understood that other types of cutting devices, including cutting devices with two reciprocating blades, may be used with the cutting guide of the present invention.

Figure 5:
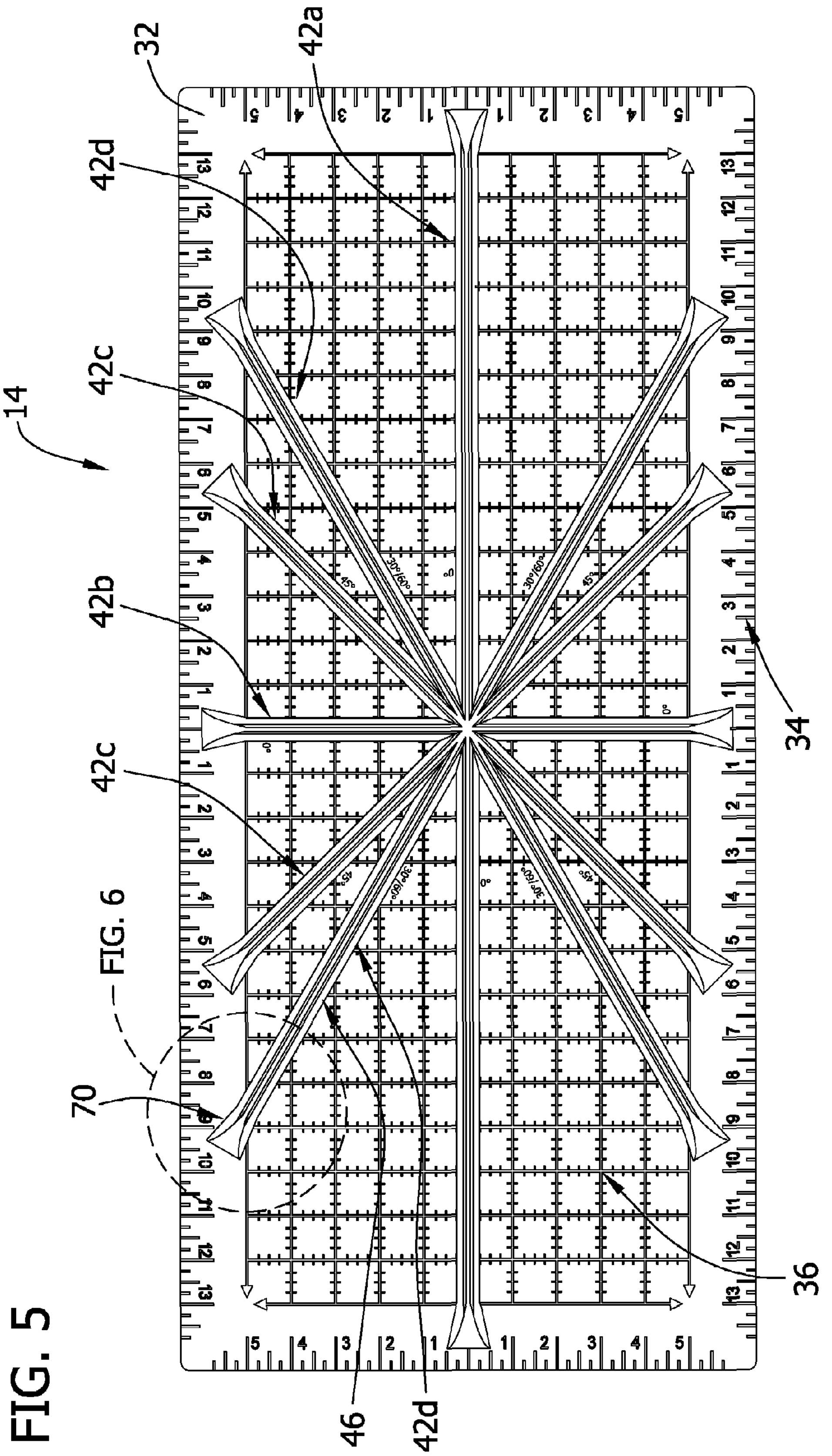
FIG. 5 is a top plan view of the cutting guide of FIG. 1.
Figure 6:
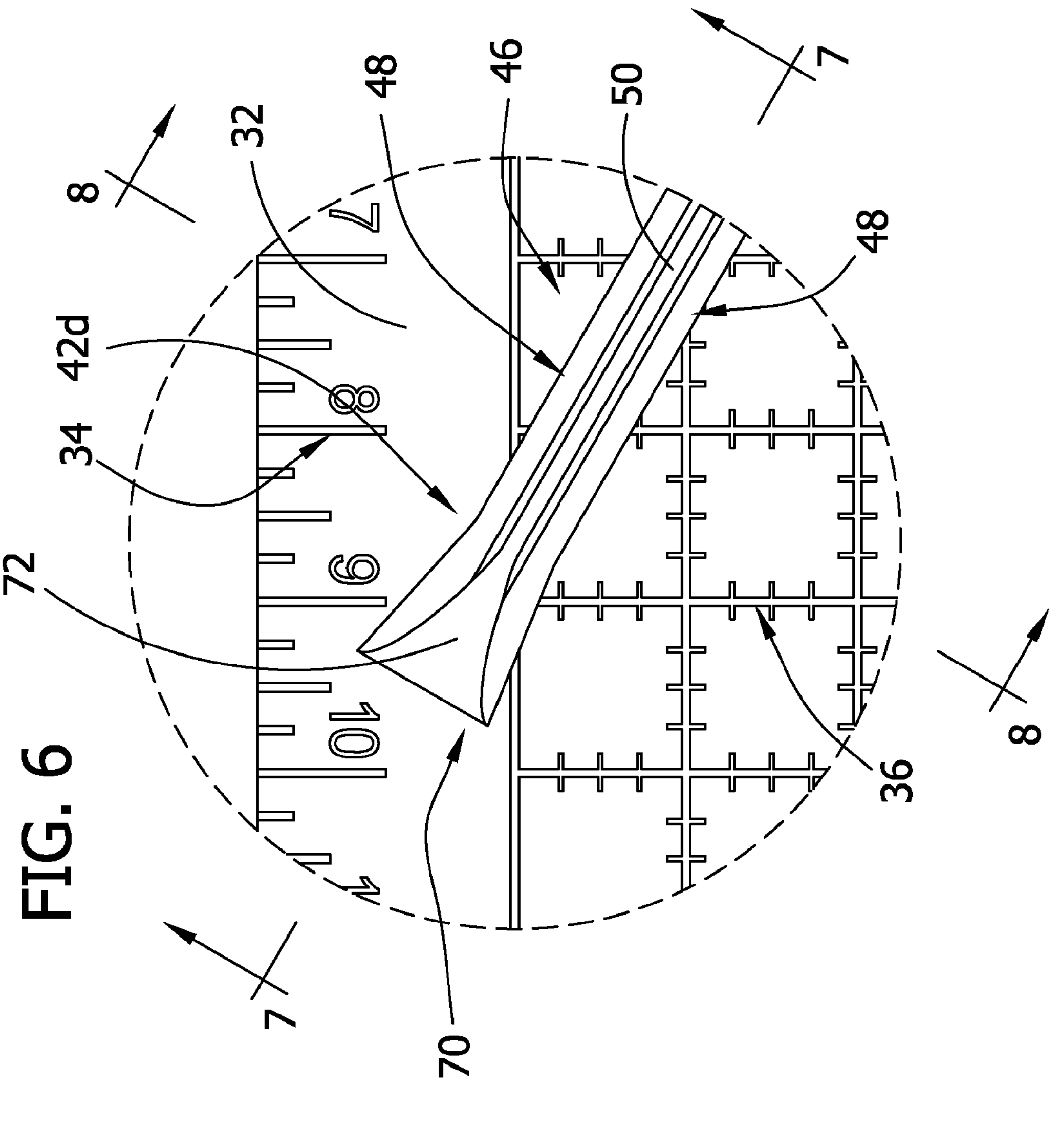
FIG. 6 is an enlarged, fragmentary view of a portion of FIG. 5.
Figure 7:
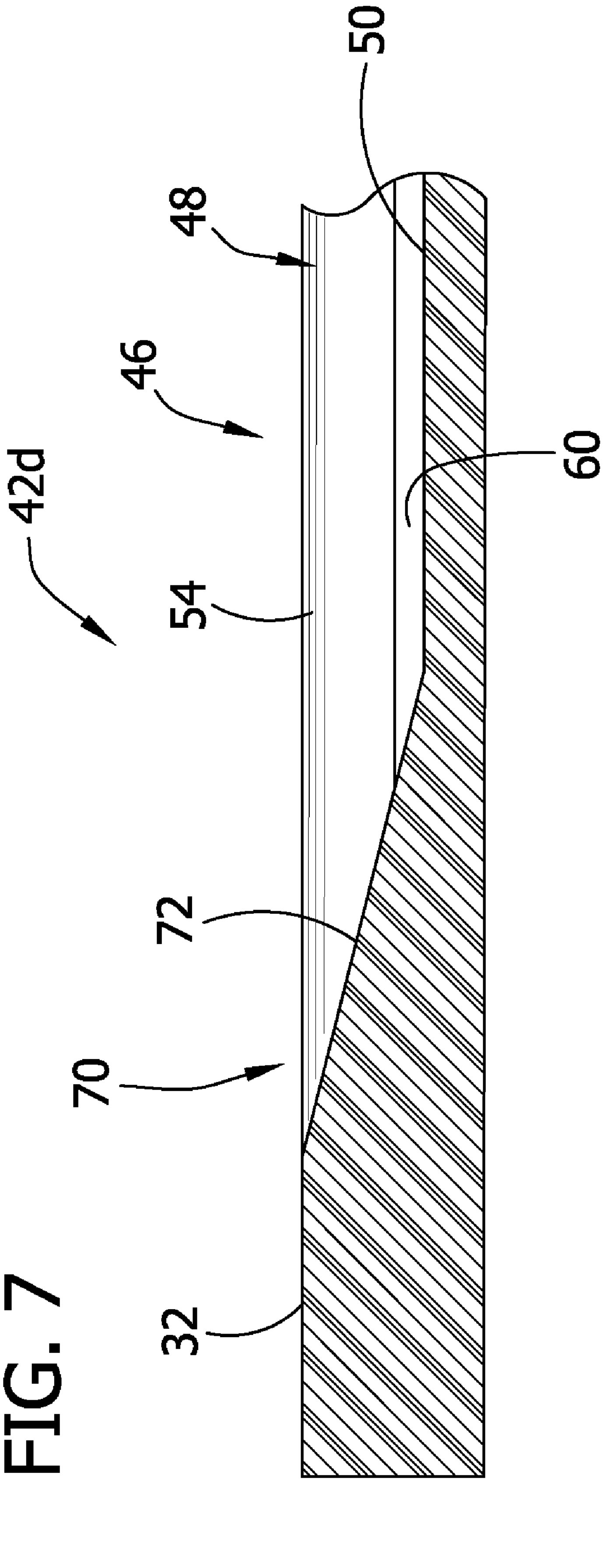
FIG. 7 is an enlarged, cross-sectional view of the portion of the cutting guide of FIG. 6 taken in the plane containing the line 7-7.
Figure 8:
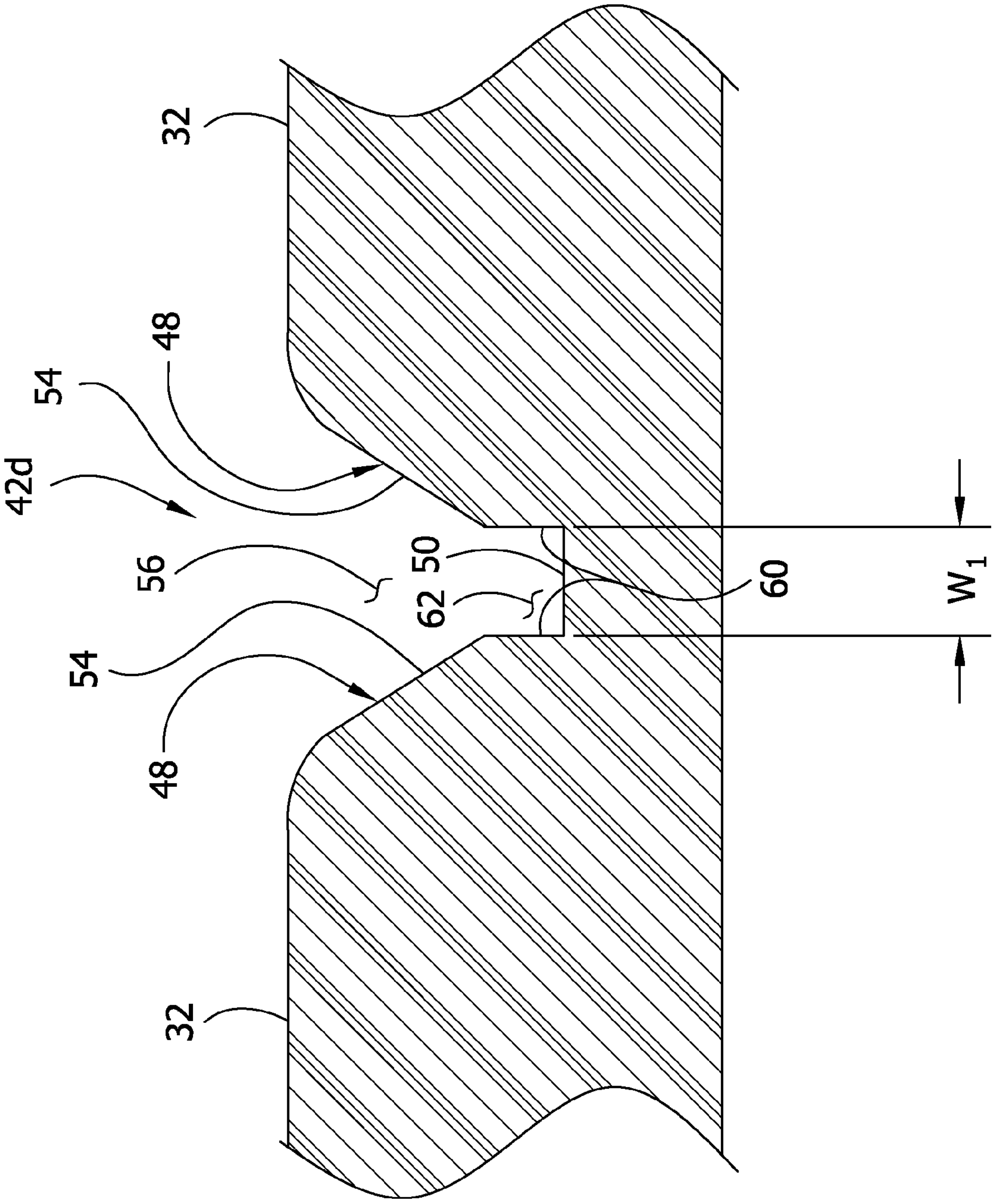
FIG. 8 is an enlarged, cross-sectional view of the portion of the cutting guide of FIG. 6 taken in the plane containing the line 8-8.

Referring to FIGS. 1 and 5, the cutting guide 14 includes a body having an upper support surface 32 for supporting the fabric F to be cut by the electric scissors 12. The support surface 32 is generally planar and has a generally rectangular perimeter with rounded corners. Distance indicia, generally indicated at 34, for measuring the fabric and the cuts to be made is imprinted or otherwise marked generally adjacent to the perimeter of the support surface 32. Other indicia, generally indicated at 36, used in the field of arts and crafts is also imprinted or otherwise marked along the support surface 32. It is understood that the cutting guide may have other types or additional indicia without departing from the scope of the invention.

Referring particularly to FIGS. 4 and 5, the cutting guide 14 has a plurality of cutting channels, generally indicated at 42*a*-42*d*, formed in its body. As explained in more detail below, each of the illustrated channels 42*a*-42*d* functions as a guide configured for use with the electric scissors 12. As shown best in FIG. 5, the cutting channels 42*a*-42*d* have lengths running along the support surface 32 that intersect each other at a central location of the guide 14. The cutting channel 42*a* runs generally along a longitudinal axis L (FIG. 1) of the guide 14 and intersects the cutting channel 42*b* at a generally perpendicular angle. The two cutting channels 42*c* are symmetrical about the cutting channels 42*a* and 42*b* and intersect the channels 42*a* and 42*b* at 45° angles. The two cutting channels 42*d* are symmetrical about the cutting channels 42*a* and 42*b* intersect the cutting channel 42*a* at 30° angles and intersect the cutting channel 42*b* at 60° angles. The channels 42*a* and 42*b* are labeled with 0° indicia (FIG. 5) to indicate that they are reference channels. Channels 42*c* and 42*d* are labeled with respective angle indicia (FIG. 5) to represent the angle at which the channels extend from (i.e., intersect) the reference channels 42*a* and 42*b*. It is understood that the cutting guide may have one or more cutting channels arranged in various ways without departing from the scope of the invention. For example, the cutting guide may have only the cutting channel 42*a* running along the longitudinal axis L of the guide and the cutting channel 42*b* running transversely across the cutting guide.

The structure of each cutting channel 42*a*-42*d* is substantially identical, and therefore, only channel 42*d* will be described in detail. Referring to FIGS. 5-9, a main, longitudinal part, generally indicated at 46, of the cutting channel 42*d* is defined by spaced apart, opposing side walls, each generally indicated at 48, extending down from the support surface 32 to a bottom surface 50 that is generally parallel to the upper support surface. The side walls 48 have opposing upper sections 54 sloping down from the support surface 32 to define a tapered upper region 56 of the channel 42*d*. Generally parallel opposing lower sections 60 of the side walls 48 extend down from lower ends of the upper sections 54 and join the bottom surface 50 at generally perpendicular angles. The lower wall sections 60 and the bottom surface 50 define a lower region 62 of the channel 42*d* having a generally uniform width $W_1$ and a height (FIG. 8) for receiving only the lower blade 18, or a portion thereof, of the electric scissors 12 and not the upper blade 20. As explained in more detail below, the cross-sectional sizes and shapes of the channels may be other than illustrated without departing from the scope of the invention.

Figure 9:
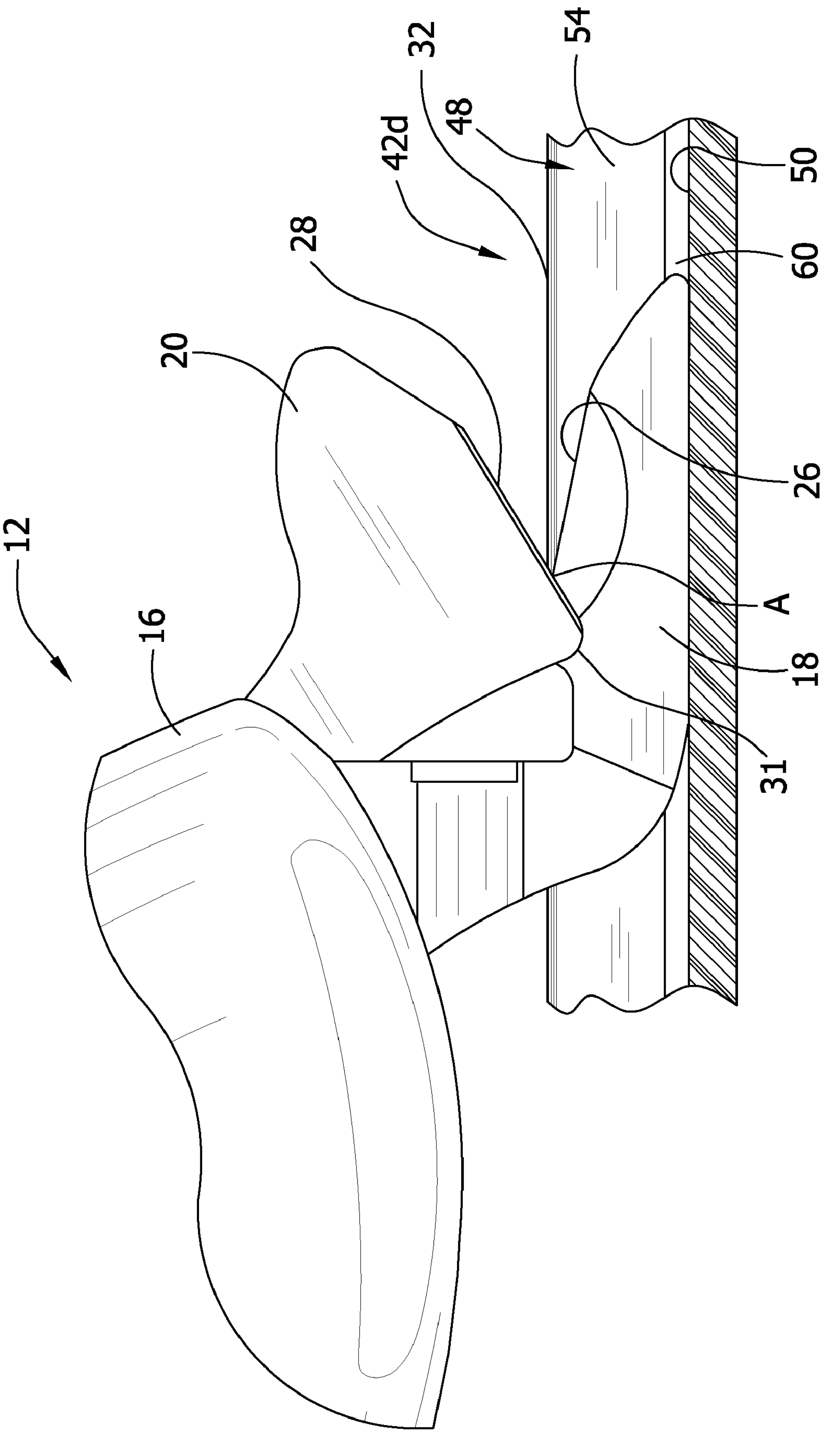
FIG. 9 is an enlarged, fragmentary side elevation of the scissors received in a channel of the cutting guide, the cutting guide being sectioned to show the scissors.
Figure 10:
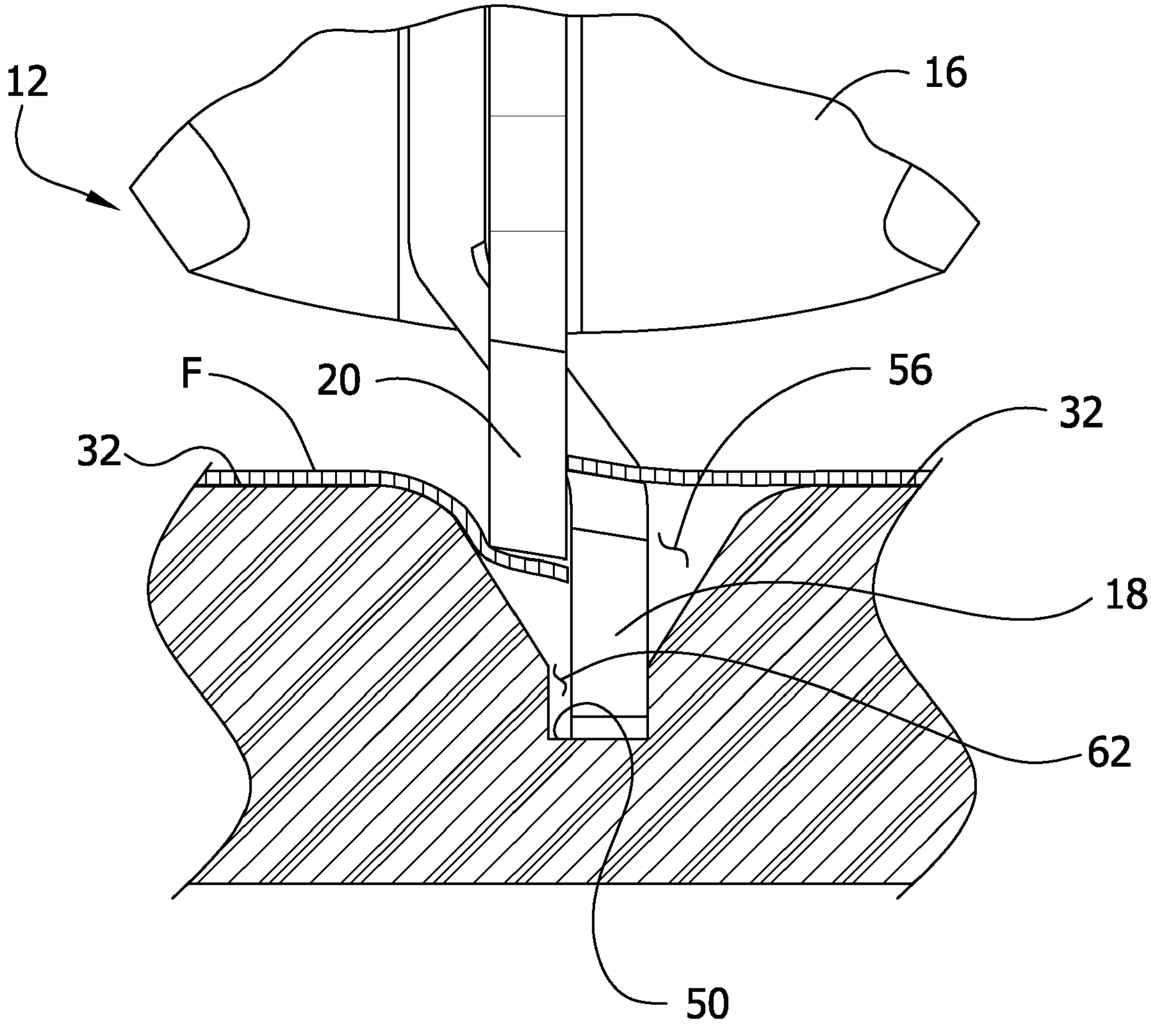
FIG. 10 is a fragmentary, front elevation of the scissors with the blades received in the channel cutting fabric and the channel being sectioned.

Referring to FIGS. 9 and 10, the lower region 62 of the channel 42*d* functions as a guide for the lower blade 18 in that it allows the user to slide the blade along the channel while substantially maintaining the blade at a constant angle relative to the material being cut (e.g., generally perpendicular). The width $W_1$ of the lower region 62 may be slightly larger than the thickness $T_1$ of the lower blade 18 so that the lower region 62 functions as a guide. For example, the width $W_1$ may be between about 10% to about 20% larger than the thickness $T_1$ of the lower blade 18 to account for any expansion or contraction of material that the guide is made from due to temperature change or other environmental factors. For example, the width $W_1$ of the lower region 62 may be between about 0.1 mm and about 0.3 mm larger than the thickness $T_1$ of the lower blade 18. In the illustrated embodiment, the bottom 22 of the lower blade 18 rests flat on the generally planar bottom surface 50 of the channel 42*d*, although it is understood that the bottom blade 18 does not have to sit flat on the bottom surface and the bottom surface does not have to be planar. Lubricous material may coat or otherwise be applied to the lower sections 60 of the walls 48 and/or the bottom surface 50 of the channel 42*d* to reduce friction with the lower blade 18.

Further, referring to FIG. 9, when the lower blade 18 is properly received in the channel 42*d* (i.e., the bottom surface 22 of the lower blade 18 is seated flat on the bottom 50 of the channel), it is preferable that at least a portion of the cutting edge 26 of the lower blade 18 is generally coplanar with the upper support surface 32 (FIG. 9). For reasons explained below, ideally the entire cutting edge 26 of the lower blade 18 is coplanar with the support surface 32 when the lower blade is properly received in the channel. However, as with the illustrated pair of scissors 12 (see FIG. 9), electric scissors and other like cutting tools typically have a lower blade 18 with a longitudinally beveled cutting edge 26 that will not be coplanar with the support surface 32 when the lower blade is received in the channel. Moreover, it is also understood that in another embodiment only a portion of the cutting edge 26 of the lower blade 18 will be coplanar with the support surface, and that other portions of the cutting edge will not be coplanar. It is understood, however, that more accurate cuts are made when the fabric F remains flat against the support surface 32 as the fabric is being cut, and increasing the deviation of the cutting edge 26, or portion thereof, of the lower blade 18 from the plane of the support surface 32 directly impacts the accuracy of cuts made using the cutting guide 10. For example, the more that the cutting edge 26, or portion thereof, projects above the support surface 32, the greater the distance the fabric F will be lifted off the support surface as it is cut, leading to less accurate cuts. Similarly, the more the cutting edge 26, or portion thereof, is disposed below the support surface 32, the greater the distance that the fabric F will be forced downward into the channel 42*d* by the upper blade 20, leading to less accurate cuts. Accordingly, the less that the cutting edge 26, or a portion thereof, deviates from the plane of the support surface 32, the more accurate the fabric F will be cut.

At least a part of the upper region 56 of the channel 42*d* has a width at least as great as the combined thickness $T_2$ (FIG. 4) of the upper and lower blades 20, 18 to allow the upper blade to oscillate up and down in the channel without contacting the side walls 48. More specifically, as shown in FIG. 10, the upper sections 54 of the side walls 48 flare laterally outward from the lower sections 60 of the side walls to provide clearance for the upper blade 20 as it oscillates up and down. Preferably the width of the upper region 56 is such that it provides clearance for the upper blade 20 while still providing support for fabric F at the support surface 32 so that the fabric lies substantially flat on the support surface at the upper region of the channel 42*d*. In other words, the width of the upper region 56 preferably is not so great that the fabric F sags downward into the channel because it is not adequately supported at the support surface 32. Because the upper section 54 of each side wall is configured to provide clearance for the upper blade 20, the scissors may be guided along the channel 42*d* in either longitudinal direction. It is understood that only one of the side walls 48 may be configured so that the corresponding upper section 54 does not interfere with the movement of the upper blade 10. As will be understood by a person having ordinary skill in the art, the cross-sectional size and shape of the channel 42*d* of the illustrated embodiment may be other than illustrated so long as the lower region 62 of the channel generally acts as a guide for the lower blade 20 and at least one of the side walls 48 of the channel does not substantially interfere with movement of the upper blade 20 during use. For example, in another embodiment the upper region of the channel may be generally U-shaped. Further, in another example, the lower sections of the side walls are not parallel, but instead taper to receive the lower blade. Other shapes and sizes are within the scope of the invention.

As described above, the main part 46 of the channel 42*d* generally has the same cross-sectional shape along its length to act as a cutting guide for the electric scissors 12. However, referring back to FIGS. 5-7, end parts, generally indicated at 70, of the channel 42*d* are of a different size and shape to facilitate insertion of the lower blade 18 into the lower region 62 of the channel and to facilitate removal of the lower blade from the channel. Bottom surfaces 72 of the end parts 70 slope downward from the support surface 32 to the bottom surface 50 of the channel 42*d*. Further, the bottom surfaces 72 of the end parts 70 have widths that taper from the support surface 32 toward the bottom surface 50 of the channel 42*d*. Through this configuration, the user may quickly and easily insert the lower blade 18 into the lower region 62 of the channel 42*a* at one of the end parts 70 of the selective channel 42*d* because the end part acts as a guide directing the lower blade into the lower region of the channel. Further, when sliding the scissors 12 along the channel 42*d* as the blades 18, 20 are cutting the fabric F, the user may move the scissors longitudinally through either end of the main part 46 of the channel while continuing to cut the fabric. The side walls 48 are configured to allow continuous, uninhibited oscillation of the upper blade 20 as the lower blade 18 moves up the sloped bottom surface 50 at the end part 70 and the scissors exit the channel 42*d*.

Using the illustrated cutting guide 14, the user arranges the fabric F to be cut on the support surface 32 so that the fabric lies substantially flat on the surface. The fabric may be measured or otherwise arranged on the support surface 32 using the 34, 36, as is generally known in the art. The electric scissors 12 are inserted into one of the cutting channels 42*d* so that the lower blade 18 is received in the lower region 62 of the channel and a portion of the cutting edge 26 of the lower blade is generally coplanar with the support surface 32. The lower blade 18 may be lowered into the selected channel 42*d* at any location along the length of the channel. For example, if the lower blade 18 is inserted into the channel 42*d* using one of the end parts 70, the tapered and sloped bottom surface 72 guides the lower blade into the lower region 62 of the channel. If the lower blade 18 is inserted into the channel 42*d* other than at one of the end margins 70 of the channel, the tapered upper region 56 of the channel 42*d* also guides the lower blade into the lower region 62 of the channel.

With the lower blade 18 in proper position in the channel 42*d*, the user pulls a trigger (not shown) of the scissors 12 to actuate reciprocal up and down movement of the upper blade 20. The user then slides the scissors 12 along the length of the channel 42*d* to quickly and precisely cut the fabric F. The fabric F remains flat on the support surface 32 as the blades 18, 20 cut through the fabric because substantially the entirety of the cutting edge 26 of the lower blade 18 is substantially coplanar with or disposed below the support surface.

The cutting guide 14 may be a molded or otherwise formed as a one-piece, integral structure. It is also contemplated that the cutting guide may be molded or otherwise formed as two or more separate segments that are releasably securable together. For example, the segments may include two halves of the cutting guide 14 that secure (e.g., by snap-fit connection) together along a securement line of the cutting guide that is generally orthogonal to the longitudinal axis. It is also contemplated that the cutting guide 14 may be formed as generally planar, overlying layers that are secured (e.g., adhered) to one another along the thickness of the cutting guide. Other ways of forming the cutting guide 14 are within the scope of the invention.

Having described the invention in detail, it will be apparent that modifications and variations are possible without departing from the scope of the invention defined in the appended claims.

When introducing elements of the present invention or the illustrated embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cutting guide for use in cutting material using a cutting tool including a counter-blade and a shearing blade adapted for oscillating movement toward and away from the counter-blade to repeatedly move a cutting edge of the shearing blade past a cutting edge of the counter-blade so that the blades overlap during a cutting operation, the cutting guide comprising:

a body having a support surface for supporting the material to be cut;

at least one elongate cutting channel extending along the support surface, said cutting channel having a bottom and opposing side walls extending from the support surface to the bottom of the channel;

wherein opposing lower sections of the side walls generally adjacent to the bottom of the channel are generally parallel and define a lower region of the channel therebetween for receiving the counter-blade of the tool and allowing sliding movement of the counter-blade along the length of the channel;

wherein opposing upper sections of the side walls define an upper region of the channel having a width greater than the width of the lower region of the channel for receiving the shearing blade and permitting the oscillating movement of the shearing blade with respect to the counter-blade when the counter-blade is received in the lower region of the channel.

2. The cutting guide as set forth in claim 1 wherein the at least one cutting channel comprises a plurality of cutting channels intersecting each other generally at a center of the support surface.

3. The cutting guide as set forth in claim 2 wherein each cutting channel comprises a main longitudinal part and an end part, said end part having a bottom surface sloping down from the support surface to a bottom surface of the main longitudinal part of the channel.

4. The cutting guide as set forth in claim 3 wherein the bottom surface of the end part has a width tapering from the support surface to the bottom surface of the main longitudinal part of the channel.

5. The cutting guide as set forth in claim 1 wherein the upper region of the channel tapers from the support surface to the lower region of the channel.

6. The cutting guide as set forth in claim 1 in combination with the cutting tool, wherein the generally uniform width of the lower region of the cutting channel is only slightly greater than a thickness of the counter-blade of the cutting tool.

7. The cutting guide as set forth in claim 6 wherein the cutting channel is configured so that the lower region of the cutting channel receives only a portion of the counter-blade that is not overlapped by the shearing blade during the cutting operation of the tool, and wherein the upper region of the cutting channel receives overlapping portions of the counter-blade and the shearing blade that overlap during the operation of the cutting tool.

8. The cutting guide as set forth in claim 7 wherein the cutting channel is configured so that when the counter-blade of the tool is received in the lower region of the cutting channel at least a part of the cutting edge of the counter-blade is generally coplanar with the support surface generally adjacent to the cutting channel.

9. The cutting guide as set forth in claim 8 wherein the cutting channel is configured so that when the counter-blade of the tool is received in the lower region of the cutting channel a majority of the cutting edge of the counter-blade is disposed slightly below the support surface generally adjacent to the cutting channel.

10. A cutting guide for use in cutting material using a cutting tool including a counter-blade and a shearing blade adapted for oscillating movement toward and away from the counter-blade to repeatedly move a cutting edge of the shearing blade past a cutting edge of the counter-blade so that the blades overlap during a cutting operation, the cutting guide comprising:

a body having an support surface for supporting the material to be cut;

at least one cutting channel formed in the body extending along the support surface, said cutting channel having a bottom and opposing side walls extending from the support surface to the bottom of the channel;

wherein the cutting channel is sized and shaped to receive the counter-blade of the cutting tool so as to allow the counter-blade to slide longitudinally within the channel so that the channel functions as a cutting guide for the tool, at least a portion of the cutting edge of the counter-blade being generally coplanar with at least a portion of the support surface generally adjacent to the cutting channel when the counter-blade is received in the cutting channel;

wherein the cutting channel is sized and shaped to allow the shearing blade to move past the cutting edge of the counter-blade and into the cutting channel without interfering with the oscillating movement of the shearing blade as the counter-blade is moved longitudinally within the channel.

11. A method of cutting material with electric scissors, the method comprising:

supporting the material to be cut on a support surface of a cutting guide;

inserting a lower blade of the electric scissors into a cutting channel of the cutting guide so that at least a portion of a cutting edge of the lower blade is substantially coplanar with the support surface of the cutting guide adjacent to the cutting channel;

oscillating an upper blade of the scissors up and down so that a cutting edge of the upper blade repeatedly moves past the cutting edge of the lower blade when the lower blade is received in the cutting channel;

moving the scissors along a length of the cutting channel so that the lower blade is guided within the channel as the upper blade oscillates up and down to cut the material.

* * * * *